(12) United States Patent
Hui et al.

(10) Patent No.: US 9,040,007 B2
(45) Date of Patent: May 26, 2015

(54) GAS TREATMENT BY CATALYTIC OZONE OXIDATION

(71) Applicant: City University of Hong Kong, Kowloon (HK)

(72) Inventors: Kwan San Hui, Hong Kong (CN); Kwok Leung Tsui, Hong Kong (CN); Man On Fu, Hong Kong (CN)

(73) Assignee: CITY UNIVERSITY OF HONG KONG, HONG KONG (HK)

( * ) Notice: Subject to any disclaimer, the term of this patent is extended or adjusted under 35 U.S.C. 154(b) by 10 days.

(21) Appl. No.: 14/065,336

(22) Filed: Oct. 28, 2013

(65) Prior Publication Data

US 2014/0065047 A1    Mar. 6, 2014

Related U.S. Application Data

(62) Division of application No. 12/900,768, filed on Oct. 8, 2010, now Pat. No. 8,568,680.

(51) Int. Cl.
*B01D 53/72* (2006.01)
*B01D 53/86* (2006.01)
(Continued)

(52) U.S. Cl.
CPC ............ *B01D 53/72* (2013.01); *B01D 53/8662* (2013.01); *B01D 53/8668* (2013.01); *B01D 2251/104* (2013.01); *B01D 2255/1021* (2013.01); *B01D 2255/1023* (2013.01); *B01D 2255/1025* (2013.01); *B01D 2255/1026* (2013.01); *B01D 2255/1028* (2013.01); *B01D 2255/104* (2013.01); *B01D 2255/106* (2013.01); *B01D 2255/20753* (2013.01); *B01D 2255/30* (2013.01); *B01D 2255/50* (2013.01); *B01D 2255/9202* (2013.01); *B01D 2255/9205* (2013.01); *B01D 2255/9207* (2013.01); *B01D 2257/2064* (2013.01); *B01D 2257/7022* (2013.01); *B01D 2257/7027* (2013.01); *B01D 2257/704* (2013.01); *B01D 2257/708* (2013.01); *B01J 29/0325* (2013.01); *B01J 29/043* (2013.01); *B01J 35/006* (2013.01);
(Continued)

(58) Field of Classification Search
CPC ........................... B01D 53/72; B01D 53/8668
USPC ............. 423/245.1, 245.3; 422/168, 177, 180
See application file for complete search history.

(56) References Cited

U.S. PATENT DOCUMENTS 5,160,586 A    11/1992  Yoshimoto et al.
5,212,140 A    5/1993   Yoshimoto et al.
(Continued)

OTHER PUBLICATIONS

Chang et al., Destruction of styrene in an air stream by packed dielectric barrier discharge reactors. Plasma Chemistry and Plasma Processing, 2005. 25(6): p. 641-657.
(Continued)

*Primary Examiner* — Timothy Vanoy
(74) *Attorney, Agent, or Firm* — Amin, Turocy & Watson, LLP

(57) ABSTRACT

In one embodiment, a catalyst for ozone oxidation of pollutant components dispersed in a gas is provided. The ozone oxidation catalyst has a porous body formed from a metal body, a ceramic, or polymeric fibers coated with metal. A catalytic noble metal composition is deposited on the surface of the porous body. The catalytic noble metal composition is formed from particles of a noble metal supported by a mesoporous molecular sieve.

20 Claims, 8 Drawing Sheets
(4 of 8 Drawing Sheet(s) Filed in Color)

(51) Int. Cl.
 B01J 29/03 (2006.01)
 B01J 29/04 (2006.01)
 B01J 35/00 (2006.01)
 B01J 35/04 (2006.01)
 B01J 37/02 (2006.01)

(52) U.S. Cl.
 CPC ............ B01J 35/04 (2013.01); B01J 37/0225 (2013.01); B01J 37/0246 (2013.01)

(56) References Cited

U.S. PATENT DOCUMENTS

| | | | |
|---|---|---|---|
| 5,214,014 | A | 5/1993 | Yoshimoto et al. |
| 5,795,559 | A | 8/1998 | Pinnavaia et al. |
| 5,990,039 | A | 11/1999 | Paul et al. |
| 6,190,627 | B1 | 2/2001 | Hoke et al. |
| 6,319,872 | B1 | 11/2001 | Manzer et al. |
| 6,403,031 | B1 | 6/2002 | Escude et al. |
| 6,503,469 | B2 * | 1/2003 | Izumi et al. .................. 423/210 |
| 6,555,079 | B2 | 4/2003 | Hoke et al. |
| 6,569,393 | B1 | 5/2003 | Hoke et al. |
| 7,473,402 | B2 | 1/2009 | Michalakos et al. |
| 8,104,272 | B2 | 1/2012 | Hirata et al. |
| 8,568,680 | B2 * | 10/2013 | Hui et al. .................. 423/245.1 |
| 2002/0108846 | A1 * | 8/2002 | Davydov et al. ............ 204/158.2 |
| 2004/0175318 | A1 | 9/2004 | Segawa et al. |
| 2005/0214186 | A1 | 9/2005 | Michalakos et al. |
| 2006/0182681 | A1 | 8/2006 | Kumar et al. |
| 2007/0060472 | A1 | 3/2007 | Fisher et al. |
| 2009/0270245 | A1 | 10/2009 | Kumar et al. |
| 2009/0324443 | A1 | 12/2009 | Whitehead et al. |
| 2011/0044874 | A1 | 2/2011 | Dang et al. |
| 2011/0139685 | A1 | 6/2011 | McCarthy et al. |

OTHER PUBLICATIONS

Subrahmanyam et al., Catalytic abatement of volatile organic compounds assisted by non thermal plasma: Part 1 A novel dielectric barrier discharge reactor containing catalytic electrode. Applied Catalysis B: Environmental, 2006. 65: p. 150-156.

Subrahmanyam et al., Catalytic abatement of volatile organic compounds assisted by non thermal plasma: Part II Optimized catalytic electrode and operating conditions. Applied Catalysis B: Environmental, 2006. 65: p. 157-162.

Kim et al., Atmospheric plasma driven catalysis for the low temperature decomposition of dilute aromatic compounds. Journal of Physics D: Applied Physics, 2005. 38: p. 1292-1300.

Chao et al., Potential use of a combined ozone and zeolite system for gaseous toluene elimination. Journal of Hazardous Materials, 2007. 143(1-2): p. 118-127.

Kwong et al., Removal of VOCs from indoor environment by ozonation over different porous materials. Atmospheric Environment, 2008. 42(10): p. 2300-2311.

Kwong et al., Catalytic Ozonation of Toluene Using Zeolite and MCM-41 Materials. Environmental Science & Technology, 2008. 42(22): p. 8504-8509.

Patcas et al., CO oxidation over structured carrier: A comparison of ceramic foams, honeycombs and beads. Chemical Engineering Science, 2007. 62: p. 3984-3990.

Giani et al., Mass transfer characterization of metallic foams as supports for structured catalysts. Industrial and Engineering Chemistry Research, 2005. 44: p. 4993-5002.

Zhao et al., VOC removal: Comparison of MCM-41 with hydrophobic zeolites and activated carbon, Energy & Fuels, 1998.12: p. 1051-1054.

Ziolek, Catalytic liquid phase oxidation in heterogeneous system as green chemistry goal—advantages and disadvantages of MCM-41 used as catalyst, Catalysis Today, 2004. 90: p. 145-150.

Xia et al., Adsorption and catalytic combustion of aromatics on platinum supported MCM-41 materials, Catalysis Today, 2001,68: p. 255-262.

Wan et al., "Catalytic combustion of methane with ozone using Pd-exchanged zeolite X: Experimental investigation and kinetics model," Combustion Science and Technology, in press, vol. 182; pp. 1429-1445; (2010).

Hui et al., "Methane emissions abatement by Pd-ion-exchanged zeolite 13X with ozone," Energy & Environmental Science, DOI:I0.I039/C002669G, 2010.

Hui et al., "Methane emissions abatement by multi-ion-exchanged zeolite A prepared from both commercial-grade zeolite and coal fly ash," Environmental Science & Technology, 42, pp. 7392-7397, 2008.

Hui et al., "Use of multi-transition metal-ion-exchanged zeolite 13X catalysts in methane emissions abatement," Combustion and Flame, 153, pp. 119-129,2008.

Hui et al., "Synthesis of MCM-41 from coal fly ash by a green approach: Influence of synthesis pH," Journal of Hazardous Materials, 137, pp. 1135-1148,2006.

Office Action dated Mar. 29, 2013 for U.S. Appl. No. 12/900,768, 18 pages.

* cited by examiner

US 9,040,007 B2

GAS TREATMENT BY CATALYTIC OZONE OXIDATION

RELATED APPLICATION

The subject application is a divisional of U.S. patent application. Ser. No. 12/900,768 (now U.S. Pat. No. 8,568,680), filed Oct. 8, 2010, and entitled "GAS TREATMENT BY CATALYTIC OZONE OXIDATION," the entirety of which is incorporated herein by reference.

FIELD

Embodiments described herein generally relate to catalysts and methods for ozone oxidation of pollutants dispersed in a gas.

BACKGROUND

Air purification devices are commonly employed in home, office and industrial settings as a way to remove harmful components from the ambient air and to improve air quality. Potentially harmful components that can be found in the air include chemical pollutants, odors, airborne particles, bacteria and/or the like. Air purification devices can be employed for many uses including treating the exhaust gases from motor vehicles and other processes, for the generation of sterile environments and "clean" manufacturing facilities, and for removing pollutants that are commonly found in home, office and industrial environments.

Volatile organic compounds (VOCs) are gaseous phase organic compounds that are present in the environment from a variety of sources. VOCs are can be outgassed by common manufactured items found in home and office settings such as carpets, paint, cleaners, furniture, and plastics as well as sources such as cigarette smoke or exhaust from passing automobiles. VOCs are also produced across a range of industrial processes including refineries, semi-conductor manufacturing plants, and chemical manufacturing including paints, coatings, pharmaceuticals.

The levels of pollutants such as VOCs can be 2-5 times higher indoors compared to outdoor levels. Mechanical ventilation systems can help decrease the levels of indoor pollutants depending upon the levels of pollutants found in the outside environment. A mechanical ventilation system can turnover an indoor air volume as the rate of 1 to 3 $hr^{-1}$, while the turnover rate can be as low as 0.1 to 0.4 $hr^{-1}$ without mechanical ventilation. The largest reduction of airborne pollutants including VOCs can be achieved by directly treating air to remove pollutants or to convert pollutants to harmless byproducts.

SUMMARY

The following presents a simplified summary of one or more embodiments in order to provide a basic understanding of some aspects of the subject disclosure. This summary is not an extensive overview. It is intended to neither identify key or critical elements of various embodiments nor delineate the scope of such embodiments. Its sole purpose is to present some concepts of the various embodiments in a simplified form as a prelude to the more detailed description that is presented later.

The ozone oxidation catalyst and methods for performing ozone oxidation disclosed herein provide for the removal of gas-phase pollutants with increased efficiency while exhibiting a low pressure drop across the ozone oxidation catalyst. The ozone oxidation catalyst is formed by depositing a catalytic noble metal composition on the surface of a porous body. The porous body is a solid body that is not a powder or non-rigid material and maintains its shape under moderate pressure or the influence of gravity.

A catalytic noble metal composition is applied to the surface of the porous body. The catalytic composition is formed from a noble metal supported on a mesoporous molecular sieve. Efficiency of the ozone oxidation catalyst is enhanced by high hydrophobicity and absorption of pollutants by the molecular sieve material. Further, the porous body provides for a high surface area for distribution of the catalytic noble metal composition. High porosity decreases the pressure drop across the ozone oxidation catalyst providing for a smaller resistance to diffusion of pollutants across the catalyst and higher space velocities of air flow through the ozone oxidation catalyst.

One aspect is directed toward an ozone oxidation catalyst formed by depositing a catalytic noble metal composition having a noble metal and a mesoporous molecular sieve support on the surface of a porous body.

Another aspect is directed toward a method for removing pollutants from a gas. The gas is passed across an ozone oxidation catalyst formed by depositing a catalytic noble metal composition having a noble metal and a mesoporous molecular sieve support on the surface of a porous body.

Yet another aspect is directed toward an apparatus for removing pollutants from the air by ozone oxidation. An ozone oxidation catalyst is formed by depositing a catalytic noble metal composition having a noble metal and a mesoporous molecular sieve support on the surface of a porous body. The ozone oxidation catalyst is placed in a reactor in order to facilitate contact between the ozone oxidation catalyst and a gas. A fan or pump for moving air or another gas is provided to form a gas flow moving into the reactor and over the ozone oxidation catalyst, where an ozone generator or ozone source is employed to add ozone to the gas flow.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
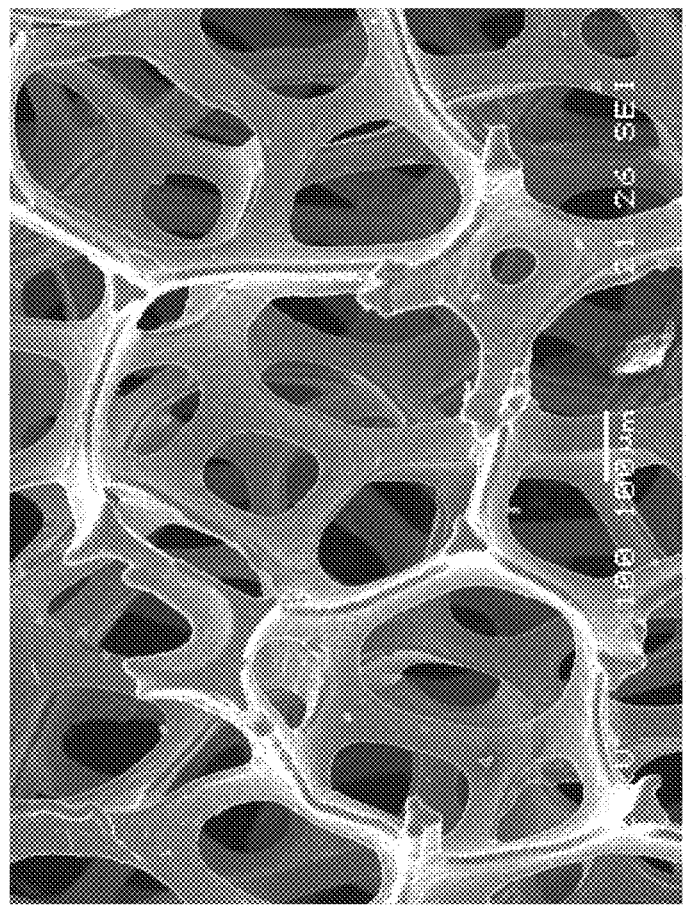
FIG. 1 shows an exemplary porous body in accordance with aspects of one or more embodiments described herein.

Air can potentially contain many pollutants, organisms and substances that are potentially delirious to human health. For examples, the air can contain suspended particles such as dust, pollen, viruses, bacteria, mold, spores, asbestos and particulate suspensions generated by tobacco smoke and combustion engines. Further, the air can contain gas-phase pollutants such as carbon monoxide, formaldehyde, and volatile organic compounds. Gas-phase pollutants can be created from combustion or from living organisms such as mold and can also be outgassed by many products including building materials, carpets, furniture and cleaning products common in home and office environments. An additional source of gas-phase pollutants includes radioactive gases such as radon that can enter buildings through rocks and from mineral building materials such as granite.

Pollutants can bring about many undesirable health consequences. Particulate and gas-phase pollutants can directly affect eye and mucous membrane irritation, allergies, the development of cancer, the respiratory system, the liver, the immune system, the reproductive system, and the nervous system. The level of pollutants found indoors can be from about two to five times higher that the level of pollutants found outdoors. The U.S. Environmental Protection Agency recognizes "Sick-Building Syndrome" as a potential result of poor indoor air quality (IAQ). Sick-Building Syndrome can generate symptoms such as headache, fatigue, skin and eye irritations, and respiratory illnesses. The EPA recognizes poor ventilation and chemical pollutants from both indoor and outdoor sources as contributing factors to Sick-Building Syndrome.

Filters are often employed to remove particulate pollution. Particulate pollution becomes physically entrapped in a filter having a pore size comparable to the size of the particulate pollutants. However, gas-phase pollutants are individual molecules and cannot easily be filtered from the air based on physical size properties. A significant source of gas-phase pollutants are volatile organic chemicals (VOCs), which is defined as any organic compound having a high enough vapor pressures under normal conditions to significantly vaporize and enter the surrounding atmosphere. VOCs are not limited to any particular chemical identity and can be hydrocarbons having alkane, alkene, alkyne, aldehyde, ketone, carbonyl, amine, alcohol, aromatic, and halo functional groups. VOCs also include amines such as ammonia, urea and haloamines although such compounds do not include carbon. Normal conditions are defined by an atmospheric pressure from about 95 to about 105 kPa, where standard atmospheric pressure is 101.325 kPa and temperature is from about −10° C. to about 50° C.

Examples of VOCS include benzene, toluene, ethylbenzene, xylenes, 1,2,4-trimethylbenzene, acetone, ethyl alcohol, isopropyl alcohol, methacrylates (methyl or ethyl), ethyl acetate, tetrachloroethene, perchloroethene (PERC), trichloroethene (TCE), d-limonene (citrus odor), a-pinene (pine odor), isoprene, tetrahydrofuran, cyclohexane, hexane, butane, heptane, pentane, 1,1,1-trichloroethane, methyl-isobutyl ketone (MIBK), methylene chloride, carbon tetrachloride, methyl ethyl ketone, 1,4-dichlorobenzene, naphthalene, Freons (trichlorofluoromethane, dichlorodifluoromethane), and formaldehyde.

Organic molecules including VOCs can be degraded to carbon dioxide and water by catalytic ozone oxidation. Ozone is capable of dissociating into an oxygen atom radical and molecular oxygen under proper conditions. Oxygen radicals are highly reactive and are capable of reacting with almost any organic molecule or material. Catalysis can be achieved by employing a surface capable of absorbing ozone and organic pollutants. A noble metal present on the surface of the ozone oxidation catalyst provides a site for ozone decomposition into molecular oxygen and an oxygen radical. The formed oxygen radical can react with virtually any organic compound to degrade the organic molecule to carbon dioxide and water. Equations 1 through 7 show an exemplary process for the degradation of methane to carbon dioxide and water.

$$O_3 + {}^\# \rightarrow O^\# + O_2 \tag{1}$$

$$O_2 + 2^* \leftrightarrow 2O^* \tag{2}$$

$$CH_4 + O^\# \rightarrow CH_4O^\# \tag{3}$$

$$CH_4 + O^* \rightarrow CH_4O^* \tag{4}$$

$$CH_4O^* + O^\# \rightarrow CH_2O^* + H_2O + {}^\# \tag{5}$$

$$CH_2O^* + O^\# \rightarrow CO^* + H_2O + {}^\# \tag{6}$$

$$CO^* + O^\# \rightarrow CO_2 + {}^* + {}^\# \tag{7}$$

In equations 1-7, the "*" symbol represents an absorption size for oxygen that can be a noble metal, a protonated (H) site or an alkali ion site on the ozone oxidation catalyst. As shown in equation 2, the ozone oxidation catalyst has the ability to breakdown molecular oxygen to oxygen radicals. In equations 1-7, the "#" symbol represents a site for the absorption and decomposition of ozone that can be a noble metal or Lewis acid site on the ozone oxidation catalyst. Equation 1 shows the breakdown of ozone into an oxygen radical that remains adsorbed on the ozone oxidation catalyst and molecular oxygen that can released as a product.

Equations 1-2 show the generation of oxygen radicals that can go on to oxidize a pollutant present in a gas flow passing over the ozone oxidation catalyst. Equations 3-4 show the initial reaction of the generated oxygen radicals with a pollutant such as methane. Equations 5-7 show the stoichiometry required to breakdown a hydrocarbon, such as methane, to carbon dioxide and water.

An ozone oxidation catalyst having advantageous features for the catalytic ozone oxidation of VOCs and other pollutants will be described with reference to the Figures. Methods and apparatuses for performing catalytic ozone oxidation will also be described. The ozone oxidation catalyst has several advantageous properties. The ozone oxidation catalyst described herein is capable of effectively catalyzing ozone oxidation at ambient temperatures. Further, the ozone oxidation catalyst described herein is capable of exhibiting a low pressure drop in a gas flow moving across the ozone oxidation catalyst. The ozone oxidation catalyst also provides a large catalytic surface per unit volume over which a gas flow can pass allowing for more efficient mixing of oxygen radicals and pollutants. As such, an efficient catalyst for the removal of pollutants from gas can be made in a smaller packaging volume.

The ozone oxidation catalysts are formed from a porous body that provides the substrate for which to provide a catalytic surface. The porous body can be a metal foam, meta-coated non-woven fiber or a porous ceramic. The porous body is coated with a particulate material having 1) a particulate mesoporous molecular sieve material; and 2) particles of a noble metal that are supported by the particulate mesoporous molecular sieve material. The porous body can be made from a solid metallic material or a polymer or fibrous material coated with metal to from a metallic surface. Further, a porous ceramic can be used as the porous body. The porous body has a cellular structure having from about 40% to about 90% of volume being void spaces. In another embodiment, the porous body has from about 50% to about 90% of the volume being void spaces. The metal material making up the porous body and the void spaces are present and distributed in a three-dimensional space.

In one embodiment, the porous body is a nickel foam. In one embodiment, the porous body has from about 60 to about 200 pores per inch. In another embodiment, the porous body has from about 75 to about 150 pores per inch. In yet another embodiment, the porous body has from about 80 to 120 pores per inch.

The porous body has a rigid or semi-rigid form. That is, the porous body has a cellular shape that maintains a shape; the porous body does not flow under the influence of gravity nor does the porous body take the shape of a new container. In one embodiment, the thickness of the porous body in the smallest dimension is from about 0.25 to about 5 cm. In another embodiment the thickness of the porous body in the smallest dimension is from about 0.5 to about 3 cm. In yet another embodiment, the thickness of the porous body in the smallest dimension is from about 0.5 to about 2 cm.

FIG. 1 shows a micrograph of an exemplary nickel metal foam with scale as shown. As can be seen in FIG. 1, the nickel foam forms a three-dimensional porous "web." The nickel foam does not have a "honeycomb" structure. As defined herein, a "honeycomb" structure is a surface formed by plural two-dimensional planes formed substantially parallel to an axis, the plural two-dimensional planes forming a polygon cross-section in a plane substantially perpendicular to the axis. Examples of polygons include triangles, rectangles, pentagons and hexagons and include both equilateral and non-equilateral polygons.

A catalytic noble metal composition is applied to the surface of the porous body to form the ozone oxidation catalyst. The catalytic noble metal composition is formed by combining a mesoporous molecular sieve material and a noble metal. The mesoporous molecular sieve is used as a support for the noble metal. The mesoporous molecular sieve can be a mesoporous silicate molecular sieve, which is known and can be formed by calcination of aluminosilicates in the presence of a surfactant. Suitable mesoporous silicon dioxide molecular sieves include MCM-41 (Mobil Crystalline Material), which is composed of a silicate arranged to form non-intersecting hexagonal channels.

Figure 2:
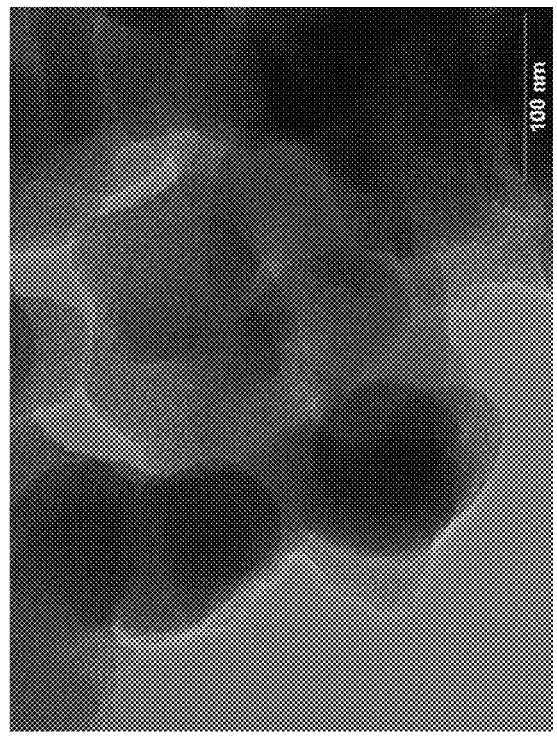
FIGS. 2A and 2B show exemplary mesoporous molecular sieves in accordance with aspects of one or more embodiments described herein.
Figure 2:
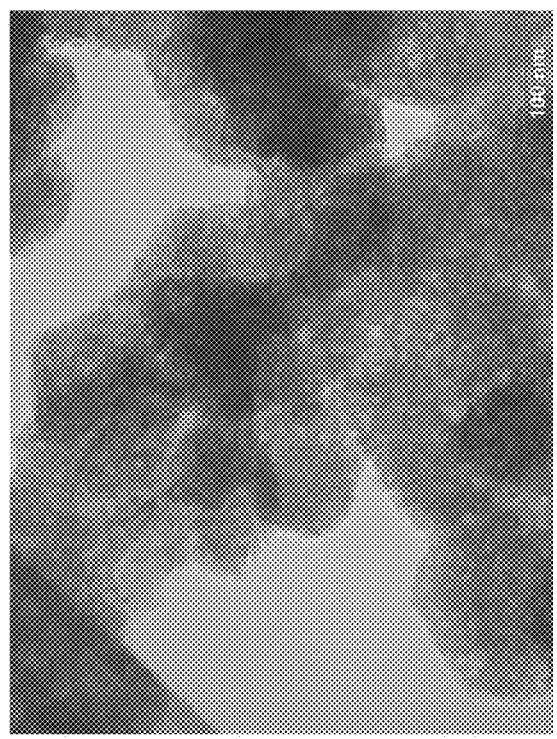

FIG. 2 shows a transmission electron microscopy (TEM) micrograph of MCM-41 provided as a particulate material. The particles shown in FIG. 2B have a mean particle diameter of 110 angstroms and the pores have a mean diameter of 31 angstroms. The MCM-41 particles shown in FIG. 2 are suitable for forming the catalytic noble metal composition described herein.

Those skilled in the art will recognize that other mesoporous molecular sieve materials, in addition to or in substitute for MCM-41, can be used as a support. For example, SBA-15 can be successfully used as a mesoporous molecular sieve material. Similar to MCM-41, SBA-15 is a type of mesoporous zeolite formed from calcined silicates in the presence of surfactants. The mesoporous molecular sieve materials are not limited to a specific chemical identity provided that the molecular sieve used as a support has a mesoporous pore structure.

In one embodiment, a mesoporous molecular sieve has pores with a mean diameter from about 5 to about 500 angstroms. In another embodiment, the mesoporous molecular sieve has pores with a mean diameter from about 5 to about 20 angstrom. In yet another embodiment, the mesoporous molecular sieve has pores with a mean diameter from about 20 to about 500 angstroms. In still yet another embodiment, the mesoporous molecular sieve has pores with a mean diameter from about 50 to about 500 angstroms.

The mesoporous molecular sieve is provided as a particulate material. The mesoporous molecular sieve is mixed with at least one noble metal provided in a particular form to form a catalytic composition. The catalytic composition having a mesoporous molecular sieve and a noble metal is applied to the surface of the described porous body to form the ozone oxidation catalyst.

The catalytic composition applied to the surface of the porous body contains at least one noble metal and a mesoporous molecular sieve as described herein. Noble metals include ruthenium, rhodium, palladium, silver, osmium, iridium, platinum and gold. In one embodiment, the mesoporous molecular sieve has a mean particle size from about 60 to about 250 nm. In another embodiment, the mesoporous molecular sieve has a mean particle size from about 75 to about 150 nm. In yet another embodiment, the mesoporous molecular sieve has a mean particle size from about 80 to about 125 nm. In one embodiment, the noble metal has a mean particle size from about 5 to about 30 nm. In another embodiment, the noble metal has a mean particle size from about 5 to about 25 nm. In yet another embodiment, the noble metal has a mean particle size from about 5 to about 15 nm.

The deposition of the catalytic composition onto the porous body can optionally be assisted by combination with a binder material. The identity of the binder material is not limited to any specific material. However, the binder material can be a $SiO_2$ material having a mean diameter from about 10 to about 40 nm.

Figure 3:
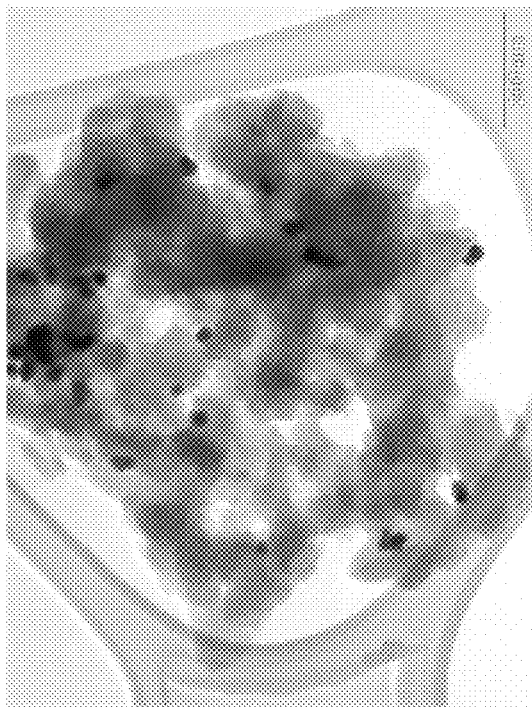
FIG. 3 shows an exemplary noble metal catalytic composition in accordance with aspects of one or more embodiments described herein.
Figure 3:
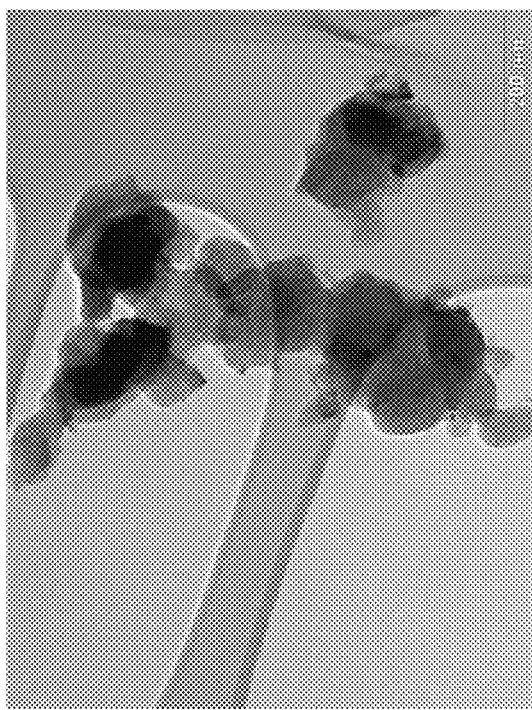

FIG. 3 shows a transmission electron microscopy (TEM) micrograph of an exemplary noble metal catalytic composition. Two different views of the catalytic composition are shown. The exemplary catalytic composition is formed from Pd having a mean particle diameter of 10 nm supported on a MCM-41 molecular sieve having a mean particle diameter of 110 nm. The loading of Pd is 4.1% by weight based on the weight of the porous molecular sieve (MCM-41). Dark areas indicate the presence of Pd while light areas indicate the presence of MCM-41 without Pd.

Figure 4:
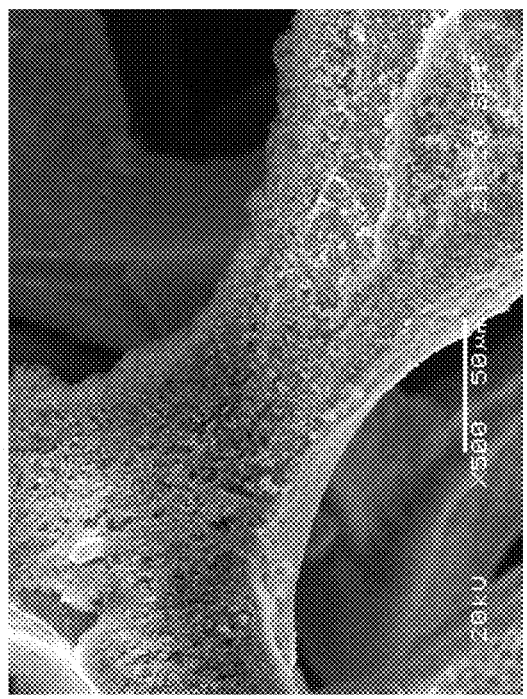
FIGS. 4A and 4B show an exemplary ozone oxidation catalyst in accordance with aspects of one or more embodiments described herein.
Figure 4:
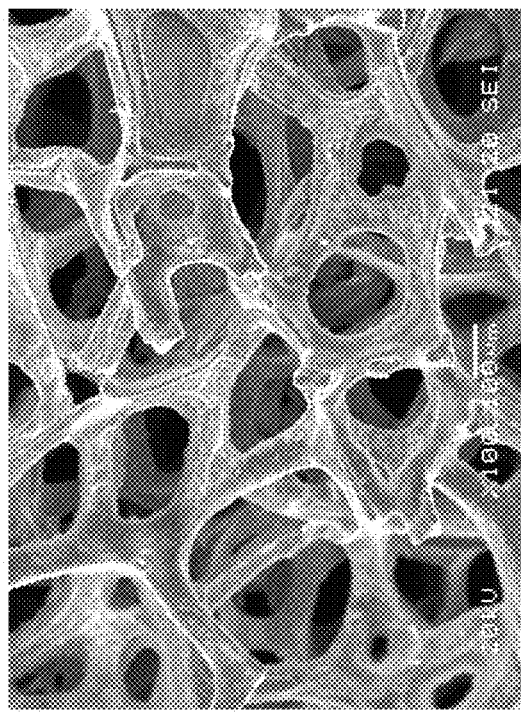

FIGS. 4A and 4B show an exemplary oxidation catalyst formed by applying the noble metal catalytic composition to a Ni foam porous body. The noble metal catalytic composition shown in FIG. 3 is applied to the Ni foam porous body shown in FIG. 1 at a loading of 8.3 wt % of the catalytic composition, where weight percent is based upon the weight of the Ni foam porous body. FIGS. 4A and 4B show micrographs of the same exemplary ozone oxidation catalyst at different magnifications, as shown. In one embodiment, the weight of noble metal is less than about 1% of the weight of the porous body. In another embodiment, the weight of the noble metal is less than about 0.5% of the weight of the porous body. As can be seen with particularity in FIG. 4B, the catalytic composition of the noble metal supported on a mesoporous molecular sieve is disturbed on the surface of the porous body while maintaining the particulate form of the catalytic composition. There is no requirement for the catalytic composition to be evenly distributed on the surface of the porous body. Further, deposition of the catalytic composition on the surface of the porous body does not modify the size or distribution of the pores and passageways formed through the porous body.

Figure 5:
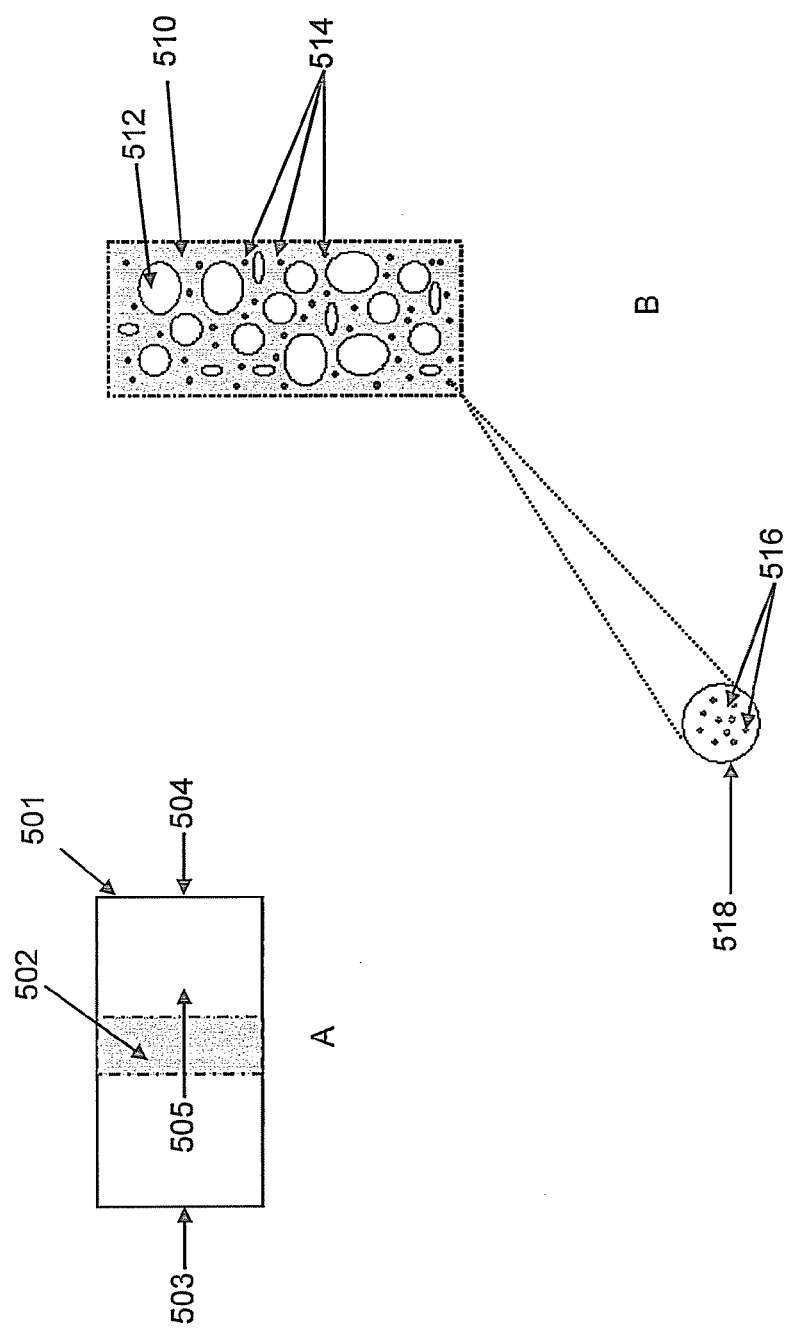
FIGS. 5A and 5B show schematics of an ozone oxidation catalyst employed as a filter inside of a reactor in accordance with aspects of one or more embodiments described herein.

The ozone oxidation catalyst can be placed in a container or reactor chamber 501 to assist in the passage of a gas flow containing one or more pollutants over the ozone oxidation catalyst 502, as shown in FIG. 5A. The direction of the gas flow is along the longitudinal axis of the reactor chamber 501.

The shape of the container is not limited to any particular shape or dimensions. However, the ozone oxidation catalyst 502 can be placed in the reactor chamber 501 such that all air passing from an inlet 503 of the container to an outlet 504 of the container passes through the ozone oxidation catalyst 502. As such, the ozone oxidation catalyst 502 acts as a filter and can be referred to as an ozone oxidation filter. The ozone oxidation catalyst 502 can be provided in the container 501 with a planar or about planar face of the filter 502 arranged to be perpendicular to the direction of flow of the gas flow 505. In one embodiment, the smallest dimension of the ozone oxidation catalyst is arranged to be about parallel to the direction of the gas flow 505. In one embodiment, the thickness of the ozone oxidation catalyst in the direction of gas flow is from about 0.25 to about 5 cm. In another embodiment the thickness of the ozone oxidation catalyst in the direction of gas flow is from about 0.5 to about 3 cm. In yet another embodiment, the thickness of the ozone oxidation catalyst in the direction of gas flow is from about 0.5 to about 2 cm.

FIG. 5B shows a schematic representation of a cross-section of the ozone oxidation catalyst 502. The volume of the ozone oxidation catalyst filter 502 includes the solid component of the Ni metal foam 510 and the void spaces 512 accounting for the porosity of the ozone oxidation catalyst filter 502. The surface of the solid component of the Ni metal foam 510, which is the solid component of the porous body, is studded with the catalytic composition 514 described above. The insert to FIG. 5B shows that each particle of the catalytic composition 514 contains noble metal particles 516 on mesoporous molecular sieve material 518.

A feature of the ozone oxidation catalysts taught herein is that there is a small pressured drop experience by a gas flow passing over the catalyst. The porous body through which the ozone oxidation catalyst is formed provides for a low impediment to gas flow compared to catalyst structures composed of a bed of backed particles. The ozone oxidation catalyst can be provided in a reactor, as described above, such that the ozone oxidation catalyst has a first side and a second side. In one embodiment, the pressure on the second side of the ozone oxidation catalyst is within about 30% of the pressure on the first side of the ozone oxidation catalyst when a gas flow is passing through the ozone oxidation catalyst at a space velocity from about 10000 to about 75000 $hr^{-1}$. In another embodiment, the pressure on the second side of the ozone oxidation catalyst is within about 20% of the pressure on the first side of the ozone oxidation catalyst when a gas flow is passing through the ozone oxidation catalyst at a space velocity from about 10000 to about 75000 $hr^{-1}$. In yet another embodiment, the pressure on the second side of the ozone oxidation catalyst is within about 20% of the pressure on the first side of the ozone oxidation catalyst when a gas flow is passing through the ozone oxidation catalyst at a space velocity from about 10000 to about 75000 $hr^{-1}$. The first side of the ozone oxidation catalyst is closer to the inlet of the reactor; therefore, the pressure on the first side of the ozone oxidation catalyst is greater than on the second side.

Ozone oxidation is particularly advantageous over alternative methods for removing gas-phase pollutants from gases, such as air ionization, by allowing for operation at ambient temperature. In one embodiment, ozone oxidation with the ozone oxidation catalyst is done at a temperature from about $-10°$ C. to about $50°$ C. In another embodiment, ozone oxidation with the ozone oxidation catalyst is done at a temperature from about $0°$ C. to about $40°$ C. In yet another embodiment, ozone oxidation with the ozone oxidation catalyst is done at a temperature from about $0°$ C. to about $30°$ C. In an additional embodiment, ozone oxidation with the ozone oxidation catalyst is performed on ambient air without actively changing the temperature of the ambient air.

Figure 6:
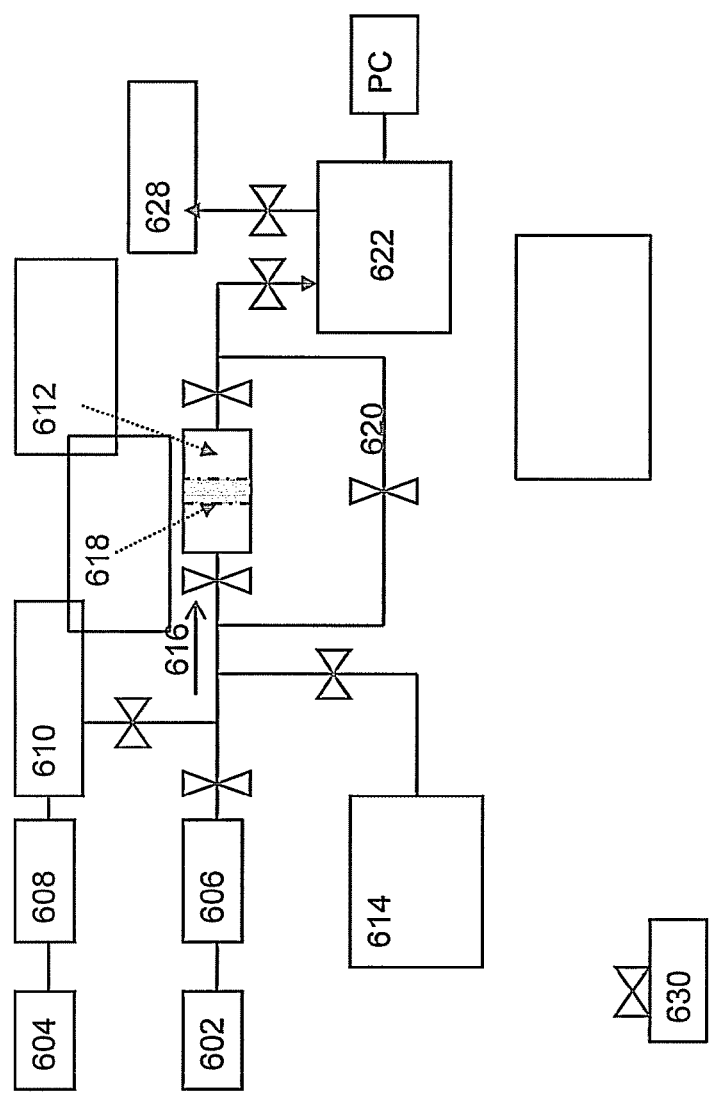
FIG. 6 shows an exemplary apparatus for monitoring the performance of the ozone oxidation catalyst.

FIG. 6 shows a schematic apparatus for measuring the effectiveness of an exemplary ozone oxidation catalyst. All of the components of the apparatus shown in FIG. 6 are not required in order for an ozone oxidation catalyst to be employed to reduce pollutants in the air or other gas. Rather, the setup shown in FIG. 6 is an example apparatus used to measure the effectiveness and efficiency of an ozone oxidation catalyst as described herein.

In FIG. 6, a source of air 602 and source of pollutant 604 are provided such that the rate of flow of air 602 and pollutant 604 can be adjusted by mass flow controllers 606 and 608, respectively. A bubbler 610 is attached in-line with the pollutant source 604 to generate small flows of pollutants. The flows originating from the air source 602 and pollutant source 604 are combined prior to introduction to reactor 612. An ozone generator 614 or another source of ozone is attached for introducing ozone into the reactor 612. As such, the gas flow 616 introduced into the reactor 612 contains air containing nitrogen and oxygen form the air source 602, pollutant from the pollutant source 604 and ozone from the ozone generator 614.

The reactor 612 contains an ozone oxidation filter 618 that contains the ozone oxidation catalyst. The gas flow 616 can be passed through the reactor 612 or diverted through a bypass 620 such that the composition of the gas flow 616 can be measured without treatment by the filter 618. The gas flow 616 or the effluent from the reactor 612 is passed to an analytical device 622. The analytical device 622 can be a FTIR spectrometer that is suitable for measuring the presence of many different kinds of VOCs, where data collected by a computer 624. Gas flow is passed to exhaust 626 after analysis. Also shown in FIG. 6, several valves 630 are used to control the movement of gasses through the apparatus.

The effectiveness of the ozone oxidation catalyst was measured using a catalyst filter prepared from a nickel foam porous body having 110 pores per inch. A catalytic composition having 4.1 weight % Pd loaded on a MCM-41 mesoporous support was applied to the surface of the nickel foam porous body; the mean particle diameter of the Pd and MCM-41 was 10 and 110 nm, respectively. Loading of the catalytic composition onto the nickel foam porous body was 8.3 weight %. The ozone oxidation catalyst was formed into a shape to fit a reactor fashioned from a stainless steel cylinder with a diameter of 5.3 cm and a length 10 cm. The thickness of the ozone oxidation catalyst filter in the direction of air flow was 1.5 cm. That is, the ozone oxidation catalyst filter occupied 15% of the length of the stainless steel cylinder used as the reactor.

Table 1 shows the dependency of the ozone oxidation filter and ozone for the removal of pollutants. A gas flow of a 4:1 mixture of nitrogen and oxygen having an ozone concentration of 510 ppm (parts per million) at the inlet of the reactor 612 was passed through the reactor 612. The space velocity of the gas flow through the reactor 612 was maintained at 33481 $hr^{-1}$. Toluene was used as an exemplary VOC (pollutant) and provided at a concentration of 21.3 ppm at the inlet of the reactor 612 except in run number 2 where toluene was omitted. Each run was performed for two hours at a temperature of $25°$ C.

TABLE 1

Comparative toluene removal efficiency under different arrangements of the ozone oxidation catalytic filter and inlet gas flow components

| Run | Arrangement | Inlet toluene concentration (ppm) | Outlet toluene concentration (ppm) | Outlet ozone concentration (ppm) | Toluene removal efficiency (%) |
|---|---|---|---|---|---|
| 1 | Air + filter | 21.3 | 21.3 | — | 0.0 |
| 2 | Ozone + filter | — | — | 413 | — |
| 3 | Air + ozone | 21.3 | 18.7 | 491 | 12.2 |
| 4 | Air + ozone + filter | 21.3 | 8.1 | 67 | 62.0 |

As shown in Table 1, the ozone oxidation filter and ozone is required for significant removal of toluene. Run 2 indicates that ozone breakdown by the ozone oxidation filter is partial and not done with complete efficiency. Run 3 indicates that ozone has some ability to react with VOCs such as toluene without the presence of the filter. Run 4 shows a significant reduction in the amount of toluene at 62%.

The concentration of ozone detected at the outlet of ozone oxidation filter for Run 4 is significantly less than for Run 2. The ozone oxidation filter catalyzes two separate chemical processes: 1) breakdown of ozone to molecular oxygen and oxygen radicals; and 2) reaction of radical oxygen with a VOC. Without wishing to be bound by any one particular theory, it is possible that the high level of ozone observed at the outlet in Run 2 is the result of some of the radical oxygen generated reacting with molecular oxygen to reform ozone. In Run 4, the reaction of oxygen radicals with toluene allows for the removal of the oxygen radicals to drive the equilibrium toward breaking down a higher percentage of the ozone present at the inlet of the gas flow.

In Table 2, the amount of toluene in the gas flow is varied to observe the affect on toluene removal efficiency. An ozone catalytic filter having the same composition as Table 1 was used for the runs shown on Table 2.

Conditions were a carrier gas of 4:1 mixture of nitrogen and oxygen and a space velocity of 33481 hr$^{-1}$. Inlet ozone concentration was 510 ppm and each run was performed at 25° C. for two hours.

TABLE 2

Comparative toluene removal efficiency under varying inlet concentrations of toluene

| Run | Inlet toluene concentration (ppm) | Outlet toluene concentration (ppm) | Outlet ozone concentration (ppm) | Toluene removal efficiency (%) |
|---|---|---|---|---|
| 1 | 11.6 | 3.8 | 114 | 67.2 |
| 2 | 21.3 | 8.1 | 67 | 62.0 |
| 3 | 42.4 | 19.6 | 49 | 53.8 |

As shown in Table 2, toluene removal efficiency is decreased as toluene concentration at the inlet is increased from 11.6 to 42.4 ppm. While efficiency of toluene removal decreases as toluene levels increase, the total amount of toluene removed and the utilization rate of ozone both increase.

In one embodiment, the ozone oxidation catalyst removes from about 40 to about 75% of the VOCs in a gas flow where the gas flow contains from about 5 to about 75 ppm of VOCs. In another embodiment, the ozone oxidation catalyst removes from about 40 to about 65% of the VOCs in a gas flow where the gas flow contains from about 5 to about 75 ppm of VOCs. In yet another embodiment, the ozone oxidation catalyst removes about 40% or more of the VOCs in a gas flow where the gas flow contains from about 5 to about 75 ppm of VOCs.

In Table 3, the amount of ozone present in the gas flow passed over the ozone oxidation catalyst is varied. An ozone catalytic filter having the same composition as Table 1 was used for the runs shown on Table 3. Conditions were a carrier gas of 4:1 mixture of nitrogen and oxygen and a space velocity of 33481 hr$^{-1}$. Inlet toluene concentration was 21.3 ppm and each run was performed at 25° C. for two hours.

TABLE 3

Comparative toluene removal efficiency under varying inlet concentrations of ozone

| Run | Inlet ozone concentration (ppm) | Inlet toluene concentration (ppm) | Outlet toluene concentration (ppm) | Outlet ozone concentration (ppm) | Toluene removal efficiency (%) |
|---|---|---|---|---|---|
| 1 | 510 | 21.3 | 8.1 | 67 | 62.0 |
| 2 | 1019 | 21.3 | 5.7 | 626 | 73.2 |
| 3 | 1631 | 21.3 | 4.0 | 1048 | 81.2 |

As shown in Table 3, an increase in the inlet concentration of ozone increases toluene removal efficiency. However, the outlet ozone concentration rises significantly and the overall efficiency of ozone utilization is increased. Optionally, the gas flow emitted from ozone oxidation catalyst can be passed through an additional filter, such as an activated carbon filter, to remove ozone from the gas flow prior to discharge to the ambient air.

In one embodiment, the ozone oxidation catalyst removes from about 35 to about 90% of the VOCs in a gas flow where the gas flow contains from about 250 to about 2000 ppm of ozone. In another embodiment, the ozone oxidation catalyst removes from about 30 to about 85% of the VOCs in a gas flow where the gas flow contains from about 250 to about 2000 ppm of ozone. In another embodiment, the ozone oxidation catalyst removes at least about 50% of the VOCs in a gas flow where the gas flow contains from about 250 to about 2000 ppm of ozone.

In Table 4, the space velocity of the gas flow passed over the ozone oxidation catalyst is varied. An ozone catalytic filter having the same composition as Table 1 was used for the runs shown on Table 4. Conditions were a carrier gas of 4:1 mixture of nitrogen and oxygen, an inlet toluene concentration was 21.3 ppm, an inlet ozone concentration of 510 ppm and each run was performed at 25° C. for two hours.

TABLE 4

Comparative toluene removal efficiency under varying carrier gas space velocity

| Run | Space velocity ($hr^{-1}$) | Inlet toluene concentration (ppm) | Outlet toluene concentration (ppm) | Outlet ozone concentration (ppm) | Toluene removal efficiency (%) |
|---|---|---|---|---|---|
| 1 | 15487 | 21.3 | 6.1 | 44 | 71.4 |
| 2 | 33481 | 21.3 | 8.1 | 67 | 62.0 |
| 3 | 52924 | 21.3 | 13.4 | 241 | 37.1 |

As shown in Table 4, an increase in the space velocity of the gas flow over the ozone oxidation catalyst filter results in a decrease in toluene removal efficiency. The decrease in toluene removal efficiency is likely the result of a decreased resident time of the reactants on the ozone oxidation catalyst.

In one embodiment, the ozone oxidation catalyst removes from about 35 to about 90% of the VOCs in a gas flow where the gas flow is passed over the ozone oxidation catalyst at a space velocity from about 10000 to about 75000 $hr^{-1}$. In another embodiment, the ozone oxidation catalyst removes from about 35 to about 85% of the VOCs in a gas flow where the gas flow is passed over the ozone oxidation catalyst at a space velocity from about 10000 to about 75000 $hr^{-1}$. In yet another embodiment, the ozone oxidation catalyst removes at least about 50% of the VOCs in a gas flow where the gas flow is passed over the ozone oxidation catalyst at a space velocity from about 10000 to about 75000 $hr^{-1}$.

One skilled in the art will readily understand that the concentration of ozone employed and the space velocity of the gas flow over the ozone oxidation catalyst can be adjusted for different applications. For example, the amount of ozone can be increased and the space velocity decreased for applications having a high level of pollutants. In addition to adjusting the velocity of the gas flow over the ozone oxidation catalyst, the space velocity can be decreased by increasing the volume of the ozone oxidation catalyst.

Figure 7:
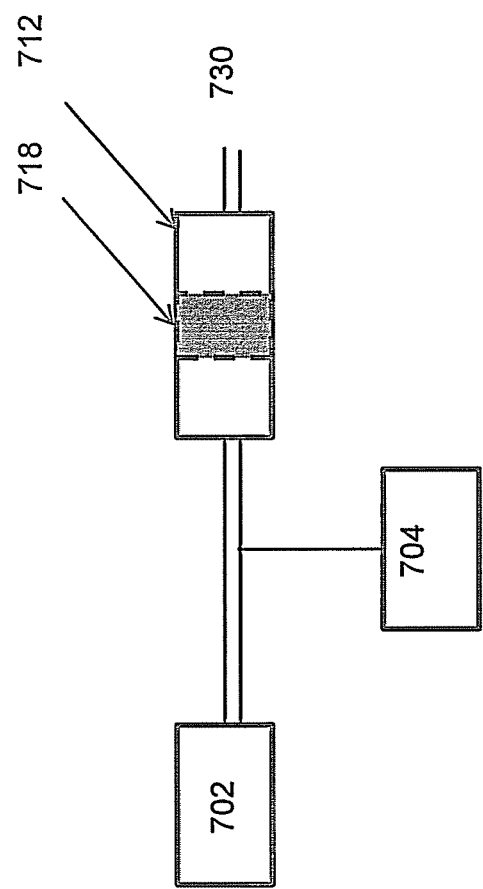
FIG. 7 shows an exemplary apparatus for removing pollutants from the air or a gas using an ozone oxidation catalyst.

A device for removing pollutants from the air or other gas employing the ozone oxidation catalyst does not require all of the components shown in FIG. 6. In reference to FIG. 7, a fan or pump 702 is used to draw ambient air or another gas into a reactor 712 having a filter 718 formed from the ozone oxidation catalyst. An ozone generator or ozone source 704 is provided to add a desirable amount of ozone to the gas entering the reactor 712. Alternatively, the ambient air or other gas enters the reactor 712 through a first inlet and the ozone from the ozone generator or ozone source enters the reactor 712 through a second inlet. That is, there is no requirement for the gas containing the pollutants for ozone oxidation and ozone to be mixed prior to entering the reactor 712. The gas exiting the reactor 712 is passed on as exhaust 730. Optionally additional filters can be included in addition to the filter formed from the ozone oxidation catalyst. For example, a pre-filter for physically filtering particulate matter, a plasma generator filter or a HEPA filter can be used in conjunction with the ozone oxidation catalyst. Additional filters can be included in the reactor 712 along with the ozone oxidation catalyst. Alternatively, additional filters can be provided for separately for filtering the air flow entering the reactor or for filtering the exhaust 730 from the reactor 712 prior to return to the environment.

Figure 8:
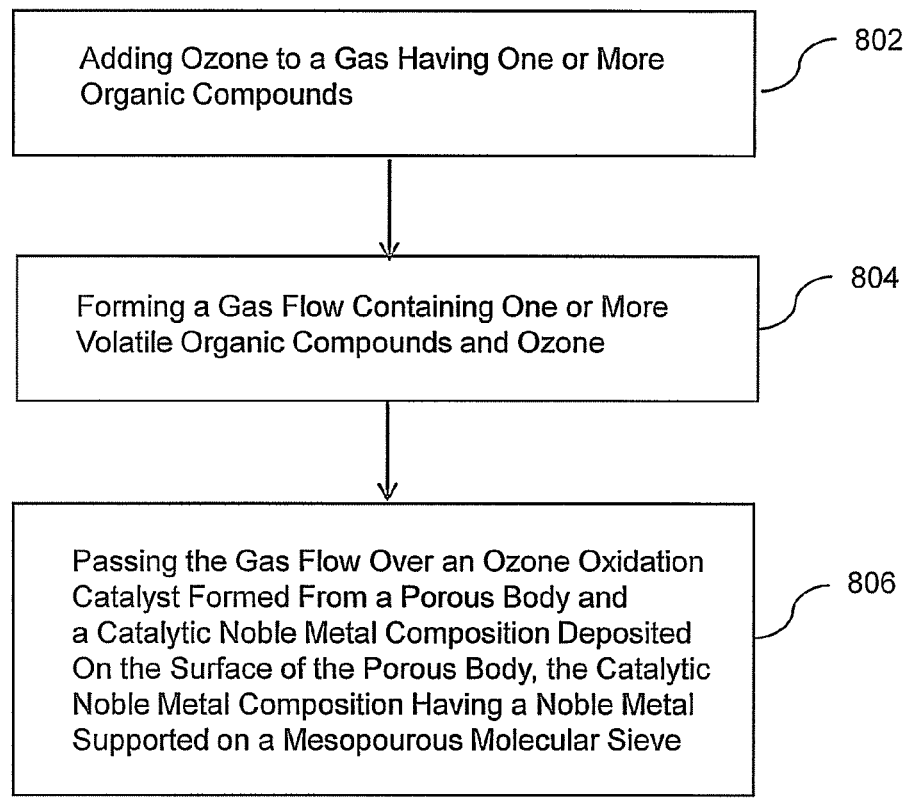
FIG. 8 shows a flow chart for removing pollutants from the air or a gas in accordance with aspects of one or move embodiments described herein.

In order to fully describe the innovations disclosed herein, acts for reducing or removing volatile organic compound from a gas will be described with reference to FIG. 8. In act 802, ozone is added to a gas having one or more volatile organic compounds dispersed therein. In act 804, a gas flow having ozone and the one or more volatile organic compounds is formed. In act 806, the gas flow having ozone and one or more volatile organic compounds is passed over an ozone oxidation catalyst. The ozone oxidation catalyst is formed from a porous body with a catalytic noble metal composition applied to a surface of the ozone oxidation catalyst. The catalytic noble metal composition has a noble metal supported on a mesoporous molecular sieve.

Other than in the operating examples, or where otherwise indicated, all numbers, values and/or expressions referring to quantities of ingredients, reaction conditions, etc., used in the specification and claims are to be understood as modified in all instances by the term "about."

While certain embodiments have been described, these embodiments have been presented by way of example only, and are not intended to limit the scope of the various embodiments described herein. Indeed, the novel methods and structures described herein may be embodied in a variety of other forms; furthermore, various omissions, substitutions and changes in the form of the methods and structures described herein may be made without departing from the spirit of the various embodiments. The accompanying claims and their equivalents are intended to cover such forms or modifications as would fall within the scope and spirit of the various embodiments.

What is claimed is:

1. A method for removing volatile organic compound from a gas, comprising:

adding ozone to a gas comprising one or more volatile organic compounds forming a gas flow containing the one or more volatile organic compounds and ozone; and passing the gas flow over a filter comprising an ozone oxidation catalyst including a porous body having a surface and a catalytic noble metal composition deposited on the surface of the porous body, the catalytic noble metal composition comprising a mesoporous molecular sieve support and a noble metal.

2. The method of claim 1, further comprising:
removing from about 35% to about 90% of the volatile organic compounds in the gas flow and wherein the passing includes passing the gas flow over the ozone oxidation catalyst at a space velocity from about 10000 to about 75000 $hr^{-1}$.

3. The method of claim 1, wherein the noble metal of the ozone oxidation catalyst is one or more selected from the group consisting of palladium and platinum.

4. The method of claim 1, wherein the one or more volatile organic compounds are one or more selected from the group consisting of benzene, toluene, ethylbenzene, xylenes,1,2,4-trimethylbenzene, acetone, ethyl alcohol, isopropyl alcohol, methacrylates ethyl acetate, tetrachloroethene, perchloroethene, trichloroethene, d-limonene, a-pinene, isoprene, tetrahydrofuran, cyclohexane, hexane, butane, heptane, pentane, 1,1,1-trichloroethane, methyl-iso-butyl ketone, methylene chloride, carbon tetrachloride, methyl ethyl ketone, 1,4-dichlorobenzene, naphthalene, trichlorofluoromethane, dichlorodifluoromethane, and formaldehyde.

5. The method of claim 1, wherein the ozone oxidation catalyst has a first side and a second side when present in a reactor, and the pressure of the gas flow on the second side of the ozone oxidation catalyst is within about 30% of the pressure of the gas flow on the first side of the ozone oxidation catalyst, the pressure on the first side greater than on the second side.

6. The method of claim 1, wherein the mesoporous molecular sieve support of the ozone oxidation catalyst is Mobil Crystalline Material 41 and the noble metal is one or more selected from the group consisting of palladium and platinum.

7. An apparatus, comprising:
a mixing component configured to add ozone to a gas comprising one or more volatile organic compounds forming a gas flow comprising the one or more volatile organic compounds and the ozone; and
a filtration component configured to direct the gas flow in a direction of a filter comprising an ozone oxidation catalyst comprising a porous body having a surface and a catalytic noble metal composition deposited on the surface of the porous body, wherein the catalytic noble metal composition comprises a mesoporous molecular sieve support and a noble metal.

8. The apparatus of claim 7, further comprising a removal component configured to remove about 35% to about 90% of the volatile organic compounds in the gas flow, wherein the directing comprises directing the gas flow in the direction of the filter comprising the ozone oxidation catalyst at a space velocity from about 10000 to about 75000 $hr^{-1}$.

9. The apparatus of claim 7, wherein the noble metal of the ozone oxidation catalyst is at least one of palladium or platinum.

10. The apparatus of claim 7, wherein the one or more volatile organic compounds comprise at least one of benzene, toluene, ethylbenzene, xylenes,1,2,4-trimethylbenzene, acetone, ethyl alcohol, isopropyl alcohol, methacrylates ethyl acetate, tetrachloroethene, perchloroethene, trichloroethene, d-limonene, a-pinene, isoprene, tetrahydrofuran, cyclohexane, hexane, butane, heptane, pentane, 1,1,1-trichloroethane, methyl-iso-butyl ketone, methylene chloride, carbon tetrachloride, methyl ethyl ketone, 1,4-dichlorobenzene, naphthalene, trichlorofluoromethane, dichlorodifluoromethane, or formaldehyde.

11. The apparatus of claim 7, wherein the ozone oxidation catalyst comprises a first side and a second side, a second pressure of the gas flow on the second side of the ozone oxidation catalyst is within about 30% of a first pressure of the gas flow on the first side of the ozone oxidation catalyst, and the first pressure on the first side is greater than the second pressure on the second side.

12. The apparatus of claim 7, wherein the mesoporous molecular sieve support of the ozone oxidation catalyst is Mobil Crystalline Material 41 and the noble metal comprises at least one of palladium or platinum.

13. A system, comprising:
means for adding ozone to a gas comprising one or more volatile organic compounds forming a gas flow comprising the one or more volatile organic compounds and the ozone; and
means for passing the gas flow toward a filter comprising an ozone oxidation catalyst including a porous body having a surface and a catalytic noble metal composition deposited on the surface of the porous body, the catalytic noble metal composition comprising a mesoporous molecular sieve support and a noble metal.

14. The system of claim 13, further comprising means for removing about 35% to about 90% of the one or more volatile organic compounds in the gas flow and wherein means for passing comprises means for passing the gas flow toward the ozone oxidation catalyst at a space velocity from about 10000 to about 75000 $hr^-$.

15. The system of claim 13, wherein the noble metal of the ozone oxidation catalyst comprises at least one of palladium or platinum.

16. The system of claim 13, wherein the one or more volatile organic compounds comprises at least one of benzene, toluene, ethylbenzene, xylenes,1,2,4-trimethylbenzene, acetone, ethyl alcohol, isopropyl alcohol, methacrylates ethyl acetate, tetrachloroethene, perchloroethene, trichloroethene, d-limonene, a-pinene, isoprene, tetrahydrofuran, cyclohexane, hexane, butane, heptane, pentane, 1,1,1-trichloroethane, methyl-iso-butyl ketone, methylene chloride, carbon tetrachloride, methyl ethyl ketone, 1,4-dichlorobenzene, naphthalene, trichlorofluoromethane, dichlorodifluoromethane, or formaldehyde.

17. The system of claim 13, wherein, in a reactor, the ozone oxidation catalyst comprises a first side and a second side, and a second pressure of the gas flow on the second side of the ozone oxidation catalyst is within about 30% of a first pressure of the gas flow on the first side of the ozone oxidation catalyst, the first pressure on the first side being greater than the second pressure on the second side.

18. The system of claim 13, wherein the mesoporous molecular sieve support of the ozone oxidation catalyst is Mobil Crystalline Material 41 and the noble metal is at least one of palladium or platinum.

19. The system of claim 13, further comprising means for generating the ozone.

20. The system of claim 13, wherein the porous body is at least one of a metal foam, meta-coated non-woven fiber, or a porous ceramic material.

* * * * *